(12) United States Patent  
Cateland et al.

(10) Patent No.: US 10,127,534 B2  
(45) Date of Patent: Nov. 13, 2018

(54) TRANSACTION SYSTEMS, AND RELATED METHODS

(71) Applicant: MASTERCARD INTERNATIONAL INCORPORATED, Purchase, NY (US)

(72) Inventors: Axel Cateland, Scarsdale, NY (US); Vincent Schlosser, Brussels (BE); Valentina Cappelli, London (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 501 days.

(21) Appl. No.: 14/494,444

(22) Filed: Sep. 23, 2014

(65) Prior Publication Data

US 2015/0088738 A1 Mar. 26, 2015

(30) Foreign Application Priority Data

Sep. 24, 2013 (GB) .................................. 1316940.4

(51) Int. Cl.
| | |
|---|---|
| *G06Q 40/00* | (2012.01) |
| *G06Q 20/10* | (2012.01) |
| *G06Q 20/22* | (2012.01) |
| *G06Q 20/32* | (2012.01) |
| *G06Q 20/42* | (2012.01) |
| *G06Q 20/36* | (2012.01) |
| *G06Q 20/40* | (2012.01) |

(52) U.S. Cl.
CPC ......... *G06Q 20/105* (2013.01); *G06Q 20/227* (2013.01); *G06Q 20/32* (2013.01); *G06Q 20/322* (2013.01); *G06Q 20/3276* (2013.01); *G06Q 20/36* (2013.01); *G06Q 20/40* (2013.01); *G06Q 20/42* (2013.01); *G06Q 2240/00* (2013.01)

(58) Field of Classification Search
CPC .... G06Q 20/10; G06Q 20/102; G06Q 20/105; G06Q 20/108; G06Q 20/40; G06Q 40/00; G06Q 20/227; G06Q 20/32; G06Q 20/3276; G06Q 20/36; G06Q 20/42
USPC ........................... 705/35, 39, 40, 41, 42, 44
See application file for complete search history.

(56) References Cited

U.S. PATENT DOCUMENTS

| | | | | |
|---|---|---|---|---|
| 2005/0027543 | A1* | 2/2005 | Labrou ................. | G06Q 20/02 705/26.35 |
| 2008/0306877 | A1* | 12/2008 | Mandeles .......... | G06Q 20/3821 705/76 |
| 2011/0238476 | A1* | 9/2011 | Carr ....................... | G06Q 30/00 705/14.25 |
| 2011/0238517 | A1* | 9/2011 | Ramalingam .......... | G06Q 20/10 705/26.1 |

(Continued)

*Primary Examiner* — Lalita M Hamilton
(74) *Attorney, Agent, or Firm* — Harness, Dickey & Pierce, P.L.C.

(57) ABSTRACT

A portable device configured to enable completion of transactions. The portable device comprises an input mechanism arranged to enable input of an identifier into the portable device, and a selection mechanism arranged to enable the user to select a payment mechanism to be associated with the identifier. The portable device further comprises a communication module arranged to transmit data relating to the identifier and the payment mechanism selection to a remote server. Completion of a subsequent transaction relating to the identifier is enabled using the selected payment mechanism.

17 Claims, 4 Drawing Sheets

(56) References Cited

U.S. PATENT DOCUMENTS

| | | | |
|---|---|---|---|
| 2014/0309864 A1* | 10/2014 | Ricci | H04W 48/04 |
| | | | 701/36 |
| 2014/0372308 A1* | 12/2014 | Sheets | G06Q 20/40 |
| | | | 705/44 |
| 2015/0052064 A1* | 2/2015 | Karpenko | G06Q 20/3829 |
| | | | 705/71 |
| 2015/0058224 A1* | 2/2015 | Gaddam | G06Q 20/327 |
| | | | 705/44 |
| 2015/0302738 A1* | 10/2015 | Geerlings | G08C 17/02 |
| | | | 340/5.25 |
| 2016/0214535 A1* | 7/2016 | Penilla | G06Q 20/18 |

* cited by examiner

TRANSACTION SYSTEMS, AND RELATED METHODS

CROSS-REFERENCE TO RELATED APPLICATION

This application claims the benefit of and priority to Great Britain Application No. 1316940.4 filed Sep. 24, 2013. The entire disclosure of the above application is incorporated herein by reference.

FIELD

The present disclosure relates to a portable device configured to enable completion of transactions. In particular, but not exclusively, the disclosure relates to a portable device configured to enable completion of transactions arising from charges incurred while operating a vehicle.

BACKGROUND

During the course of operating a vehicle there are many situations where costs are incurred which must be settled by the vehicle driver without delay. For example, at a re-fuelling station, fuel must be paid for before the vehicle leaves the station. Further examples of where costs are incurred in this way include car parks, toll-gates or toll-bridges, and congestion charge zones in which a congestion charge applies.

Each of these charge points offers measures to facilitate payment of the associated charges in a manner that is convenient for a user, which are considered in turn below.

Many re-fuelling stations allow the user to pay at a pump, rather than having to enter a sales room to liaise with a cashier to make payment. To enable pump payment, a card reader with a number-pad is provided next to the pump, into which the user can insert a payment card to complete a fuel purchase. The user validates payment by entering a personal identification number (PIN) associated with the payment card into the number-pad. Once the correct PIN has been entered, the user removes the payment card and uses the pump to take the required fuel. Such systems typically limit the amount that can be charged to a payment card in a single transaction, for example a maximum of £100 (about $160 USD).

This system has the benefit that the user does not need to queue at a checkout in the sales room in order to pay for their fuel. Therefore, the overall time taken for the user to re-fuel their vehicle is reduced. However, the user is still required to actively pay each time they re-fuel their vehicle.

In a more advanced system, some toll-gate operators offer a method of automatic payment for regular users as a more convenient alternative to a conventional toll-gate payment method in which drivers must stop at the toll-gate to make payment, typically using cash. In the alternative system, the user registers an account with the operator. Toll charges are then charged to the user's account. Once registered, the system associates the user with a personal identifier which enables automatic identification of the user at the toll-gate. For example, the user may be supplied with a card containing an electronic chip which can be recognized automatically at the toll-gate to perform the function of the personal identifier. Alternatively, the personal identifier may be a registration plate of the vehicle, which can be recognized at the toll-gate using automatic number plate recognition (ANPR) techniques. Each time the user drives through the toll-gate, the personal identifier is recognized, and a charge is added to the user's account. The user then settles their account periodically, for example every month. Settling the account can be handled automatically by billing a debit or credit card belonging to the user.

This system offers a more convenient experience for the user compared with the conventional toll-gate payment method mentioned above. Furthermore, the user does not need to carry payment means in the vehicle. However, registering and maintaining an account with the toll operator can be onerous, and typically involves an initial registration charge, and so is only worthwhile for regular users of that particular toll-gate.

A similar system is used in congestion charge zones, in that a user can register an account with a congestion charge operator. Thereafter, each time the user's vehicle enters the congestion charge zone, the operator recognizes this using ANPR, and adds a charge to the user's account. The account is then settled periodically by the user. As with the toll-gate system, use of this congestion charging system is only suitable for regular users of that particular congestion charge zone.

Turning now to car-parks, one measure that is sometimes implemented is to employ a system that uses ANPR to identify vehicles entering the car park. The system then maintains a record of how long each vehicle has been in the car park. In this way, when a user wants to pay for parking, they need only enter the registration number of their vehicle, and the cost of the stay is generated automatically. The user can then pay using a conventional payment method.

In this system, a physical ticket does not need to be issued, and thus the user can pay when leaving the car park rather than on arrival. This affords the user more flexibility, as they do not need to be concerned with returning to their vehicle before a parking ticket expires. However, the user must actively pay on each occasion, which is time consuming. In some arrangements, such as in some airport car parks, the user can register the vehicle with a car park operator so that payment can be made in advance, and the transaction is validated using ANPR. In such arrangements, there is still the drawback of the requirement to undergo a registration process with the car park operator.

As each system operates independently, the user must register which each separately. Therefore, the overall burden on the user may still be significant. This problem is compounded by the fact that even within the same category of charging system, the user may have to register with multiple operators. For example, two sets of toll-gates may be controlled by two different operators, requiring the user to undergo two separate registration procedures.

Against this background, there is a desire to provide a means of payment of charges incurred during operation of a vehicle which offers improved convenience for the user compared with known systems.

SUMMARY

According to a first aspect of the present disclosure, there is provided a portable device configured to enable completion of transactions, the portable device comprising an input mechanism arranged to enable input into the portable device of an identifier associated with a user of the portable device, and a selection mechanism arranged to enable the user to select a payment mechanism to be associated with the identifier, the portable device further comprising a communication module arranged to transmit data relating to the identifier and the payment mechanism selection to a remote server, and wherein completion of a subsequent transaction relating to the identifier is enabled using the selected payment mechanism.

In some embodiments, the payment mechanism may be a digital wallet entry held in a digital wallet. The digital wallet may be hosted by the remote server. The digital wallet entry is associated with a payment card, and provides a convenient and centralized payment mechanism to be used in completing transactions.

Enabling completion of transactions may, for example, include facilitating a registration process that a user can undergo to register with an operator of a service. Associating an identifier relating to the user with a payment mechanism provides a flexible arrangement, as a payment mechanism may be related to a payment card, but not necessarily tied to a particular operator. This creates the potential for the portable device to enable completion of transactions with multiple operators.

Configuring a portable device to allow a user to enable completion of transactions provides a convenient arrangement for the user, who is able to conduct an enabling process at any location.

By communicating with the remote server, which is, for example, in the case of a payment mechanism in the form of a digital wallet entry, a wallet server configured to maintain a digital wallet for several users, the portable device can configure the remote server to complete subsequent transactions. Therefore, the portable device is not required for anything further once completion of transactions has been enabled. Accordingly, the portable device does not need to be carried by the user. Completion of subsequent transactions is handled by the remote server, which typically has more robust security measures than the portable device.

The communication module may receive data relating to digital wallet entries from the remote server. This beneficially allows the portable device to retrieve information on digital wallet entries that is held securely in a wallet server for presenting to the user. This means wallet entry data need not be stored locally on the portable device.

The input mechanism or input means may comprise a sensor or sensing means arranged to capture the identifier. The sensor may, for example, be configured to capture an image of the identifier. A processor may be arranged to identify the identifier from within the image. For example, the sensor may be a camera. This embodiment provides a convenient arrangement that enables a user to input the identifier into the portable device simply by taking a photograph of the identifier, thereby minimizing input required from the user. Since the camera is provided on a portable device, the identifier can be photographed in any convenient location.

The input mechanism may comprise an alphanumeric keypad configured to allow the user to enter the identifier into the portable device. This feature enables the user to enter the identifier in a manner that ensures the device obtains the identifier correctly.

The selection mechanism may comprise an arrangement for presenting to the user at least one digital wallet entry associated with a payment card. This could be a display on the portable device, on which images of the at least one digital wallet entry can be presented. Alternatively, the arrangement for presenting to the user may comprise an audio component.

In one embodiment, the arrangement for presenting to the user is a touch screen. This provides an enhanced user interface, and also potentially combines the presenting means with the selection mechanism in an efficient arrangement.

Advantageously, the portable device may be a mobile telephone, which is therefore likely to be frequently carried by the user. The portable device may alternatively be a tablet device. Accordingly, the portable device is typically available to the user for conducting an enabling process in any required location. Furthermore, since the user is likely to possess a mobile telephone, a separate device does not need to be provided to allow the user to enable completion of transactions.

The identifier may be a registration number of a vehicle associated with the user. In this embodiment, the portable device can be used to enable completion of transactions arising through use of the vehicle, as the registration number provides a convenient and reliable means of identification.

The input mechanism may include an automatic number plate recognition system for registration number recognition. This beneficially minimizes input required from the user, and permits fast input of the identifier into the portable device.

The transaction relating to the identifier for which completion is enabled may be payment for passage of the vehicle through a toll-gate. This advantageously means that toll-gate charges can be paid for automatically, allowing the vehicle to pass through the toll-gate more quickly than if stopping to pay at the toll-gate, without any requirement to set-up and maintain an account with a toll operator.

Similarly, the transaction relating to the identifier for which completion is enabled may be any of the following: payment for entry of the vehicle into a congestion charging zone; payment for parking in a car park; and payment for petrol (gas) at a petrol station (gas station). As above, by enabling automatic payment for each of these transactions, the time taken to complete the transactions can be reduced, and the user is not required to create and maintain an account with individual operators of each service.

These examples of transactions are not limiting, and the skilled person will appreciate that the transaction could be any transaction relating to use of a vehicle, for example servicing and repair, boarding of a ferry or a train, payment at drive-through restaurants, or even fines imposed for exceeding speed limits or parking illegally.

When a vehicle is recognized at a particular location, for example at a toll-gate, this creates an opportunity for relevant information, for example traffic updates, to be provided to a user by forwarding the data to the portable device.

Alternatively, the identifier may be a personal identifier in the form of the user's face. In this embodiment, the personal identifier can be used to complete any transaction where the user is present. For example, the transaction could be payment for goods when shopping, payment for use of public transport, or checking in at an airport. The skilled reader will appreciate that there are many further types of transactions possible. To facilitate this, the input mechanism may include an automatic facial recognition system for recognition of the user's face, to enable the user to enter the personal identifier into the portable device quickly and with minimal input.

According to a second aspect of the present disclosure, there is provided an application for a portable device, the application being arranged to enable completion of transactions, the portable device comprising an input mechanism arranged to enable input of data into the portable device; a selection mechanism; and a communication module arranged to transmit data to a remote server; wherein the application is arranged to enable input of an identifier using the input mechanism; present to a user at least one payment mechanism; enable the user to select a payment mechanism to be associated with the identifier using the selection mechanism; and transmit data relating to the identifier and the payment mechanism selection to a remote server using the communication module; and wherein completion of a subsequent transaction related to the identifier is enabled using the selected payment mechanism.

The payment mechanism may be a digital wallet entry of a digital wallet, the digital wallet entry being associated with a payment card.

The portable device may be a portable device according to the first aspect.

According to a third aspect of the present disclosure, there is provided a method of completing transactions, comprising capturing an identifier; identifying a payment mechanism associated with the identifier, wherein the payment mechanism is related to a payment card; and completing the transaction using the payment mechanism.

The payment mechanism may be a digital wallet entry of a digital wallet.

In one embodiment, the method comprises capturing an image of the identifier, and analysing the image to identify the identifier.

The identifier may be a registration number of a vehicle, in which case the method can be used for the completion of any transaction arising through use of the vehicle, with the registration number providing a convenient and reliable means of identification. For example, the transaction can be any of those described above in relation to the portable device, including: payment for passage of the vehicle through a toll-gate; payment for entry of the vehicle into a congestion charging zone; payment for parking in a car park; and payment for petrol at a petrol station. The advantages of using the method for the completion of such transactions are discussed above in relation to the portable device.

The registration number may be identified using an automatic number plate recognition algorithm, thereby making use of conventional technology for improved integration with existing systems.

In an alternative embodiment in which the identifier is a personal identifier in the form of the user's face, the method can be used for the completion of any transaction where the user is present, as discussed above. The user's face may be identified using an automatic facial recognition algorithm in order to provide an automated system in which security measures can be implemented.

The payment mechanism may have been associated with the identifier by a user in a prior registration process. For example, the prior registration process may have been conducted using the portable device of the first aspect, or the application of the second aspect.

The method may further comprise sending a confirmation request to a user prior to completing the transaction. This beneficially provides real-time user validation for transactions. This may be particularly useful for higher value transactions, for example purchasing petrol for a vehicle, or purchasing a high value item in a shop. In this embodiment, the method may comprise completing the transaction in dependence on receiving confirmation from the user.

According to a fourth aspect of the present disclosure, there is provided a system for automatic completion of a user transaction with an operator, the system comprising a first remote server comprising a digital wallet; a second remote server associated with the operator; and a portable device arranged to communicate with the first server and to enable the user to associate a digital wallet entry stored on the first server with an identifier related to the user; wherein the transaction is associated with the identifier; and wherein the first remote server communicates with the second remote server so as to complete the transaction using the digital wallet entry.

According to a fifth aspect of the present disclosure, there is provided a method for enabling completion of transactions, the method comprising associating a payment mechanism with an identifier; and transmitting data relating to the identifier and the payment mechanism selection to a remote server; wherein completion of a subsequent transaction relating to the identifier is enabled using the selected payment mechanism.

It will be appreciated that exemplary and/or optional features of the first, second, third, fourth and fifth aspects of the disclosure may be incorporated alone or in appropriate combination in any other aspect(s) of the disclosure also.

DRAWINGS

In order that the disclosure may be more readily understood, exemplary non-limiting embodiments thereof will now be described, by way of example only, with reference to the accompanying drawings, in which.

DETAILED DESCRIPTION

Embodiments of the present disclosure embrace various categories of payment system, including each of those described above. By way of example, an automatic payment system according to one embodiment which is configured for use with a toll-gate is now described with reference to FIGS. 1 to 4. However, the skilled reader will appreciate that the system described below could readily be adapted for use with other types of payment systems, such as those found in car parks, petrol stations and congestion charge zones.

Figure 1:
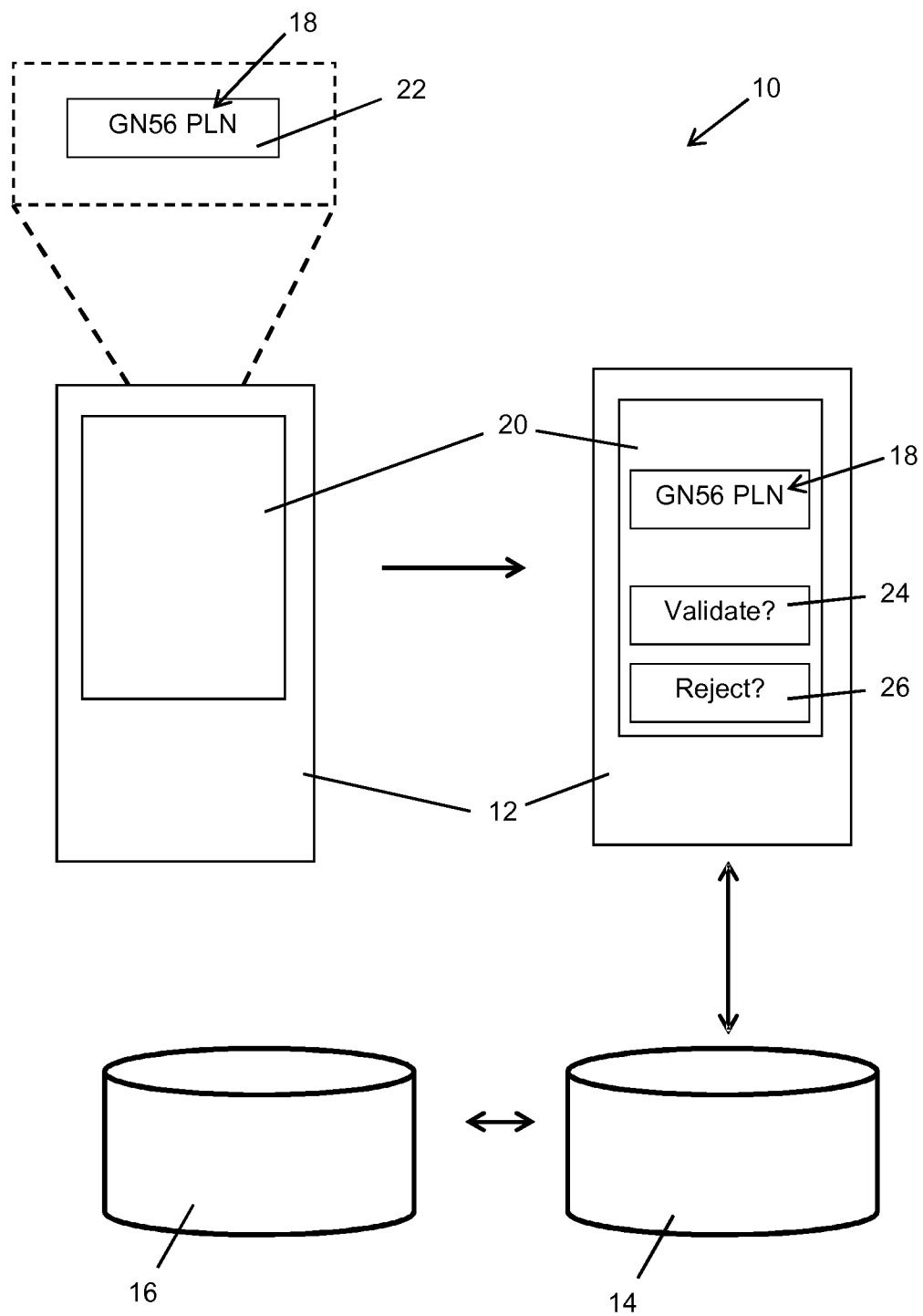
FIG. 1 is a schematic drawing of a first part of an automatic payment system according to an embodiment of the disclosure, showing components used for associating a vehicle registration with a digital wallet entry and registering with a toll server.

FIG. 1 shows components of an automatic payment system 10 which is used to make payment for a vehicle passing through a toll-gate. The components shown in FIG. 1 are those that are used in an initial registration process in which the vehicle is registered with an operator of the toll-gate in order to enable automated payments. These components include a portable device 12 such as a mobile telephone, a payment server 14, and a toll operator server 16 belonging to a toll operator.

The portable device 12 is arranged to determine a vehicle registration number 18, and to associate the registration number 18 with a digital wallet entry associated with a payment card belonging to the user. The vehicle registration acts as a personal identifier, to enable identification of a user associated with the vehicle when the vehicle subsequently approaches a toll-gate. The pairing of the registration number 18 with the digital wallet entry constitutes registration data which the portable device 12 transmits to the payment server 14. Data is transmitted between the portable device 12 and the payment server 14 using a conventional data connection, for example a wireless local area network (WLAN, commonly referred to as "Wi-Fi") or a mobile data connection.

The payment server 14 is in communication with the toll operator server 16, and the payment server 14 forwards the registration data on to the toll operator server 16. The toll operator server 16 later communicates with the payment server 14 in order to charge payments arising from toll-gate use to digital wallet entries located on the payment server 14.

In order to perform the above functions, the portable device 12 includes an input mechanism, a communication module, a processing means, a selection mechanism, a display 20, and a software application configured to navigate the registration process.

The input mechanism enables the portable device 12 to obtain data relating to the vehicle registration number 18. In this embodiment, the input mechanism is in the form of a camera (not shown) which is used to capture an image of a vehicle registration plate 22. The input mechanism also comprises an alphanumeric keypad which is presented on the display 20 of the portable device 12.

The processing means (not shown), for example a processor, enables the device to analyse each captured image of a vehicle registration plate 22 in order to identify the registration number 18 contained within. For example, the processing means can implement conventional automatic number plate recognition (ANPR) algorithms in order to extract the required alphanumeric data from the image.

Extraction of the vehicle registration number 18 using the camera in combination with ANPR offers a convenient registration process for the user. However, the portable device 12 also provides the option for the user to enter the registration number 18 directly into the portable device 12 using the alphanumeric keypad.

Once the registration number 18 has been determined, it can be presented to the user on the display 20 for validation. The display 20 is a touch screen, and, as illustrated in FIG. 1, validation is performed by way of virtual buttons 24, 26 presented on the touch screen. The user validates or rejects the registration number 18 presented by pressing an appropriate virtual button 24, 26.

Once the registration number 18 has been validated, the communication module is used to transmit data to the payment server 14.

Figure 2:
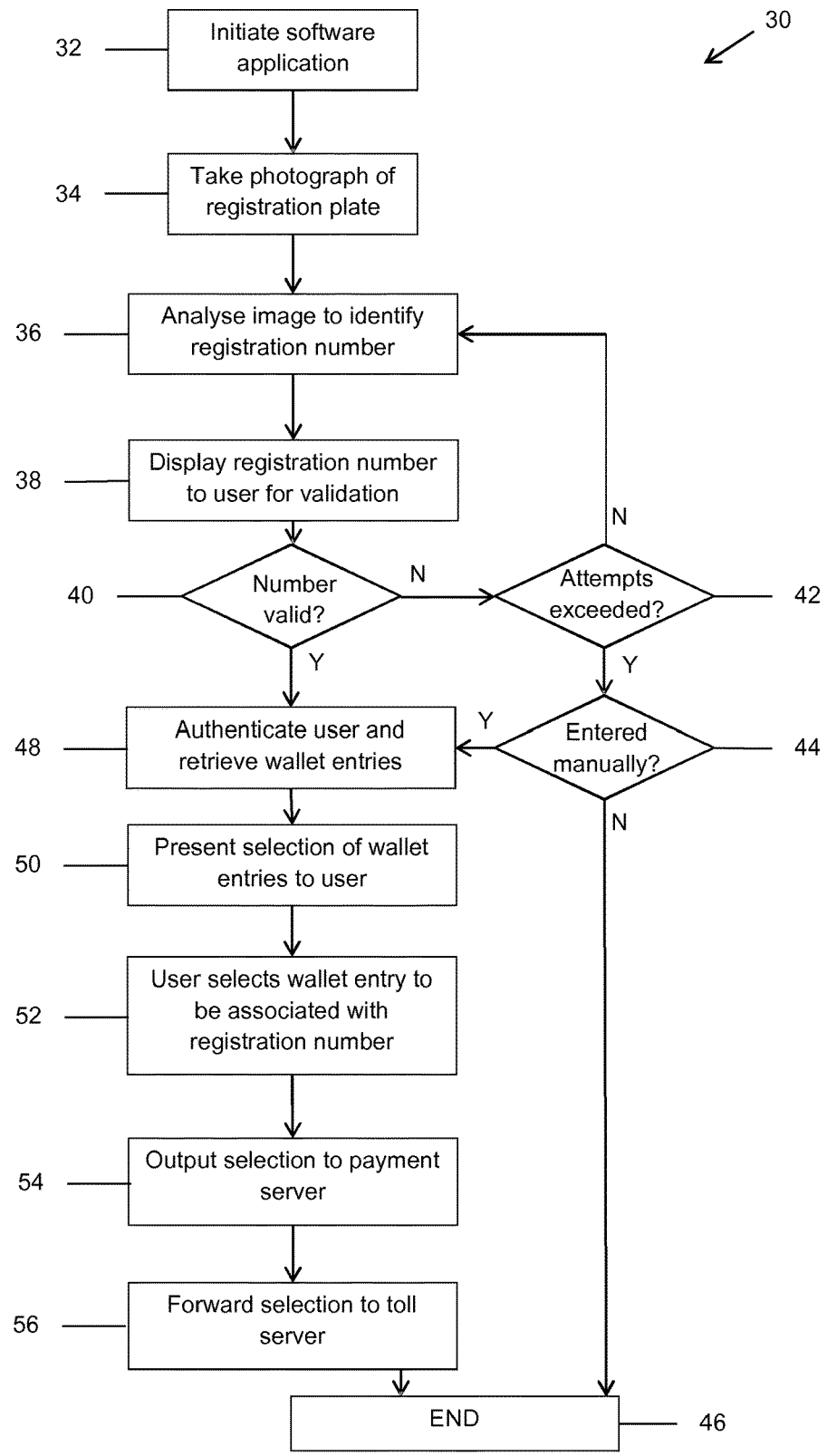
FIG. 2 is a flow diagram illustrating a process for using the first part of the automatic payment system of FIG. 1 to associate a vehicle registration with a digital wallet entry and register with a toll server.

With reference to FIG. 2, a registration process 30 using the system shown in FIG. 1 is now described in more detail.

As shown in FIG. 2, the process 30 begins with the user initiating at Step 32 the software application. When the software application is started, the application puts the portable device 12 into a camera mode, thereby enabling the user to capture the required image. Accordingly, the process 30 continues with the user capturing at Step 34 an image of a vehicle registration plate 22 using the portable device 12, the registration plate 22 belonging to the vehicle that the user wishes to register with the automatic payment system 10. The portable device 12 then analyses at Step 36 the image in order to identify the registration number 18. The registration number 18 is then displayed at Step 38 to the user for validation.

The user then presses at Step 40 one of the virtual buttons 24, 26 on the display 20 to either validate that the registration number 18 has been determined correctly, or else to indicate that the displayed registration is incorrect. If the number is incorrect, the application checks at Step 42 whether an allowable number of attempts for determining the registration number 18 has been exceeded. If not, the application then returns to Step 36 and re-analyses the image, and presents the identified registration number 18 to the user for validation once more.

If the allowable number of attempts has been exceeded, the application then offers at Step 44 the user the option to enter the registration number 18 manually using a virtual alphanumeric keypad on the display 20. If the user chooses not to enter the registration manually, the process 30 then ends at Step 46. The user can then recommence the process 30 in order to capture a fresh image of the vehicle registration plate 22. If the user enters the registration manually, the process 30 continues as described below.

Once the user has validated the registration number 18, or manually entered the registration number 18, the portable device 12 then communicates with the payment server 14 in order to authenticate the user and retrieve at Step 48 a selection of digital wallet entries associated with the user. Authentication of the user is achieved using conventional processes, which, for example, may involve requiring entry of a personal identification number (PIN), and making use of a secure element provided in the portable device.

The digital wallet entries are virtual equivalents of physical payment cards that belong to the user and must have previously been registered with the payment server 14. Digital wallet entries are well known in the art, for example for making online payments in e-commerce transactions. In this embodiment of the disclosure, a digital wallet entry is used to make automated payments at the toll-gate each time the vehicle registered by the user passes through, as will be described in more detail later. In this way, the digital wallet entry acts as a payment mechanism for the completion of transactions.

Once the payment server 14 has returned the selection of digital wallet entries available to the user, the selection is then presented at Step 50 to the user on the display 20. For example, the wallet entries may be displayed as graphical representations of the physical payment cards to which the wallet entries relate. The user then uses the touch screen display 20 to select at Step 52 a wallet entry that is to be used to make toll-gate payments for the vehicle being registered. In this way, the display 20 forms part of a selection mechanism to enable user selection of the appropriate payment means for toll-gate payments.

The portable device 12 then outputs at Step 54 the registration data comprising the vehicle registration number 18 and the user's wallet entry selection to the payment server 14. The payment server 14 then forwards at Step 56 the registration data to the toll operator server 16, and the process ends at Step 46.

The toll operator server 16 holds the registration data in a database, and uses the registration data to automatically deduct payments from the wallet entry each time the vehicle passes through the toll-gate. This process is explained in more detail now with reference to FIGS. 3 and 4.

Figure 3:
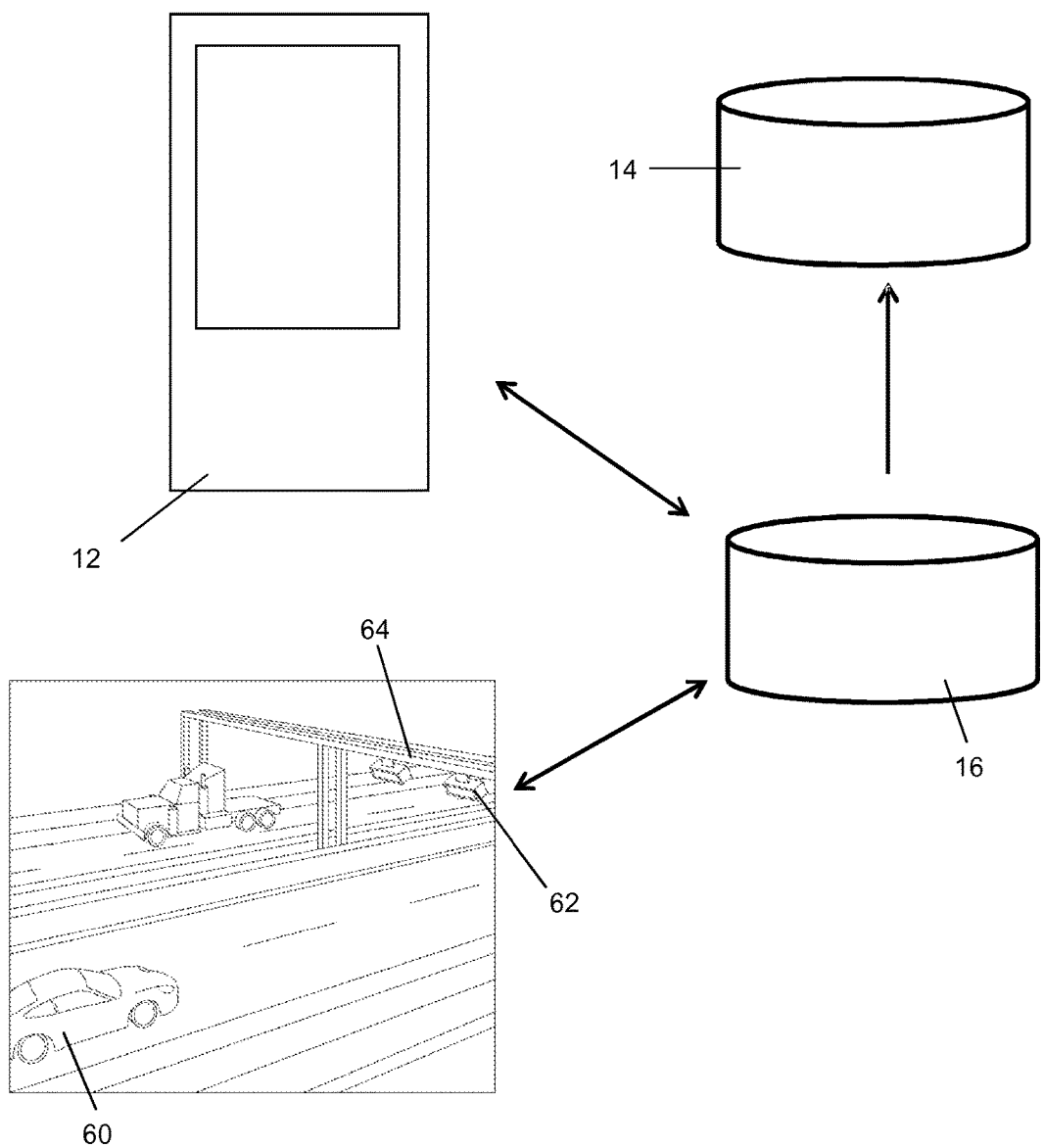
FIG. 3 is a schematic drawing of a second part of an automatic payment system according to an embodiment of the disclosure, showing components used for making automatic payments.

FIG. 3 shows various components involved in an automatic payment performed using the automatic payment system 10 of this embodiment. As shown in the figure, as a vehicle 60 approaches the toll-gate (not shown) the vehicle 60 passes under a camera 62 mounted on an overhead gantry 64. The camera 62 is part of a conventional ANPR system, and accordingly the camera 62 captures an image of the front of the vehicle 60 from which the vehicle registration number 18 can be identified. A barrier of the toll-gate remains lowered if no vehicle registration number 18 can be identified, or if the identified vehicle registration number 18 is not registered on the toll operator server 16.

The ANPR system is in communication with the toll operator server 16. This corresponds to known arrangements in which toll operators use ANPR to automatically charge users who have created an account with the toll operator as described previously. In this case, however, the toll operator does not hold an account for the user. Instead, when the vehicle 60 is recognized, the toll operator server 16 cross references the registration number 18 to determine the wallet entry to be used to complete payment. The toll operator server 16 then communicates with the payment server 14 in order to complete payment using the wallet entry.

As a security measure, the software application on the portable device 12 periodically queries the toll operator server 16 to check when automatic payments have been made. The toll operator server 16 returns a payment history to the portable device 12, which is presented to the user. Alternatively, the toll operator server 16 or the payment server 14 may periodically push data to the portable device 12 indicating the user's payment history. This enables the user to review any transactions which have been completed using a digital wallet entry belonging to them. If the user does not recognize one or more of the transactions, this may indicate fraudulent use of the wallet entry or the vehicle registration number that the user has registered. The user can then alert the toll operator to the problem.

Figure 4:
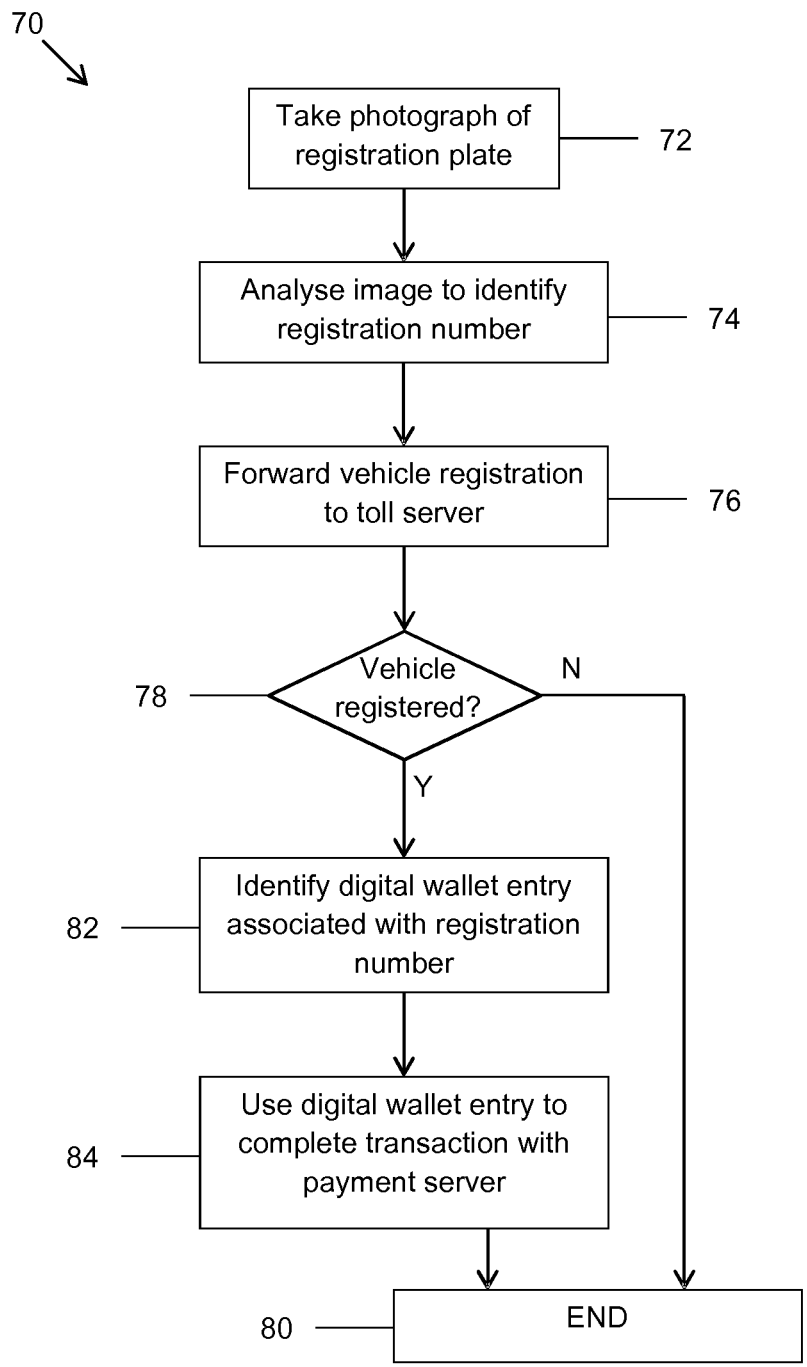
FIG. 4 is a flow diagram illustrating a process for using the second part of the automatic payment system of FIG. 2 to make an automatic payment.

FIG. 4 shows the steps of an automatic payment process 70 involving the above components. The process 70 begins when the ANPR system detects that a vehicle 60 is approaching, at which point the camera 62 captures at Step 72 an image of the front of the vehicle 60 to include the vehicle's registration plate 22. The ANPR then analyses at Step 74 the image in order to determine the registration number 18 of the vehicle 60. The registration number 18 is then forwarded at Step 76 to the toll operator server 16.

The toll operator server 16 then checks at Step 78 the registration number 18 received from the ANPR against a database of vehicle registration numbers to see whether the vehicle 60 is registered with the toll operator for automatic payment. If the vehicle 60 is not registered, the process 70 ends at Step 80, and a barrier on the toll-gate remains lowered. The vehicle 60 must then stop at the toll-gate in order for the user to complete payment in the conventional manner.

If the vehicle 60 is registered for automatic payment, the toll operator server 16 identifies at Step 82 the wallet entry to be used to complete payment for passage of the vehicle 60 through the toll-gate.

The toll operator server 16 forwards the registration data corresponding to the vehicle 60 to the payment server 14 in order to request authorization of payment. The payment server 14 then processes at Step 84 this data to complete authorization. This includes conducting various checks that will be familiar to the skilled reader, such as identifying the user and/or the portable device, and verifying authorization to use the digital wallet entry from a card issuing bank that has issued the physical payment card to which the digital wallet entry relates. When a wallet entry is created, all of the details of the physical payment card are entered that are required for completing payments, including the card number, card expiry date, and a billing address. Therefore, payment can be completed without user input. Since a toll-gate transaction amount is relatively low, for example around 2 GBP (about $3 USD), payment can be completed without requiring entry of a PIN. If the checks are completed satisfactorily, the payment server 14 returns an authorization response to the toll server 16. In this way, the toll server 16 does not require further details relating to the user or to the wallet entry. The toll server 16 then forwards the authorization message to an acquiring bank, which then retrieves the required funds from the card issuing bank and passes the funds to the toll server 16 to complete payment.

These final steps are completed in a very short time, during which the toll-gate barrier is raised, enabling the vehicle 60 to pass through potentially without stopping. A speed restriction can be implemented before the gate in order to ensure there is sufficient time to complete automatic payment before the vehicle 60 arrives at the gate.

Since the automatic payment system 10 described above is that controlled by the payment server 14 rather than by a toll operator, the system can be used with multiple toll operators. Therefore, the user only has to undergo one registration procedure in order to activate automatic payment at any toll-gate which uses the automatic payment system 10.

Furthermore, as mentioned above, the automatic payment system 10 is not limited to use with toll-gates, and could also be used in car parks, petrol stations and congestion charge zones. As above, the user still only needs to undergo a single registration procedure in order to enable automatic payment in all of these places.

For example, a registered user can use car parks participating in the automatic payment system 10 without having to purchase parking tickets. The user's vehicle 60 is photographed on entry to the car park such that the vehicle's registration number 18 can be identified. The vehicle 60 is then photographed again on exiting the car park, and the duration of the vehicle's stay is calculated. Payment is then deducted automatically from the user's registered digital wallet entry in the same manner as described above in relation to the toll-gate payment system.

For the purpose of using the automatic payment system 10 in a petrol station, the software application may include an additional feature whereby a confirmation request is presented to the user prior to deducting payment from the digital wallet entry. This is because the user has more time in this situation to provide confirmation, whereas requiring confirmation for the toll-gate scenario would require the user to stop the vehicle 60. Also, the transaction total is typically much higher when purchasing petrol, which provides further incentive to obtain confirmation from the user.

A confirmation process is triggered when the payment server 14 receives a payment request from a petrol station operator. The payment server 14 then forwards a confirmation message to the portable device 12 which is displayed to the user. The confirmation message contains details of the requested payment, including a transaction total and a location for the petrol purchase. The user then either presses a first virtual button to authorize payment, or otherwise presses a second virtual button to reject the payment. For enhanced security, the user may be required to enter a PIN to validate the transaction. Accordingly, an authorization message or a rejection message is then transmitted to the payment server 14. If the payment server 14 receives an authorization message, the payment is then processed as described above. If a rejection message is received, this is forwarded to the petrol station operator. Alternative payment is then requested at the petrol station.

The skilled reader will appreciate that there are several further scenarios in which implementation of a confirmation process may be useful to prevent misuse of the automatic payment system 10. For this reason, the payment server 14 is configured to make a judgement as to whether confirmation is required upon receipt of each payment request. The payment server 14 makes the judgement using conventional algorithms, for example by implementing a "risk based decision" system.

While the above described embodiments make use of a vehicle registration number to act as a personal identifier, the disclosure also extends to the association of alternative personal identifiers with a digital wallet entry for the purpose of automatic payment.

For example, the personal identifier could be a user's face, with a facial recognition system used in the place of the ANPR system described above. In such embodiments, the automatic payment system could be used in a variety of situations, for example in a retail environment or in public transport. Cameras with facial recognition technology could be installed at a point of sale, or at a point of entry, in order to effect automatic payments as the user approaches the sale or entry point.

It will be appreciated by a person skilled in the art that the present disclosure could be modified to take many alternative forms to that described herein, without departing from the scope of the appended claims.

What is claimed is:

1. A portable device configured to enable completion of transactions, the portable device comprising:
   an input mechanism arranged to enable input of an identifier into the portable device, the identifier including a registration number having numeric and/or alphabetic characters specific to a vehicle associated with a user;
   a selection mechanism arranged to enable the user to select a payment mechanism to be associated with the identifier; and
   a communication module arranged to transmit, to a remote server, registration data for the vehicle and data indicative of the selected payment mechanism, the registration data including at least a part of the identifier;
   wherein a subsequent transaction is enabled for passage of the vehicle through a toll-gate, based on the identifier and using the selected payment mechanism, without the portable device being arranged to communicate the identifier or the selected payment mechanism to an operator of the toll-gate involved in the transaction.

2. A portable device according to claim 1, wherein the payment mechanism is a digital wallet entry of a digital wallet, and wherein the digital wallet entry is associated with a payment card.

3. A portable device according to claim 2, wherein the communication module is arranged to receive data relating to digital wallet entries from the remote server.

4. A portable device according to claim 2, wherein the selection mechanism is arranged to present to the user at least one digital wallet entry associated with a payment card.

5. A portable device according to claim 4, wherein the selection mechanism comprises a touch screen.

6. A portable device according to claim 1, wherein the input mechanism comprises a sensor arrangement arranged to capture the identifier.

7. A portable device according to claim 6, wherein the sensor arrangement is arranged to capture an image of the identifier, and the input mechanism further comprises a processor arranged to identify the identifier from within the image.

8. A portable device according to claim 7, wherein the sensor arrangement is a camera.

9. A portable device according to claim 1, wherein the input mechanism comprises an alphanumeric keypad configured to allow the user to enter the identifier into the portable device.

10. A portable device according to claim 1, wherein the portable device is a mobile telephone or tablet device.

11. A portable device according to claim 1, wherein the input mechanism includes an automatic number plate recognition system for registration number recognition.

12. A portable device according to claim 1, wherein another subsequent transaction is enabled for parking or for petrol at a petrol station, based on the identifier and using the selected payment mechanism, without the portable device being arranged to communicate the identifier or the selected payment mechanism to an operator involved in the another subsequent transaction.

13. A system for use in providing passage through toll-gates, the system comprising: an application for a portable device, a payment server, and a toll operator server;
   wherein the application is non-transitory and is stored in the portable device, the portable device comprising an input mechanism arranged to enable input of data into the portable device, a selection mechanism, and a communication module arranged to transmit data to the payment server,
   wherein the application is arranged to cause the portable device to:
      enable input of an identifier using the input mechanism, the identifier including numbers and/or letters specific to a vehicle associated with a user;
      present to the user at least one payment mechanism;
      enable the user to select the at least one payment mechanism to be associated with the identifier using the selection mechanism; and
      transmit registration data, including at least a part of the identifier, and the payment mechanism selection to the payment server using the communication module;
   wherein the payment server is configured to forward the registration data to the toll operator server; and
   wherein the toll operator server is configured to capture an image of the identifier of the vehicle at a toll-gate and to communicate, to the payment server, a subsequent transaction for passage of the vehicle through the toll-gate using the selected at least one payment mechanism without the identifier or the selected at least one payment mechanism being transmitted, by the portable device, to the toll operator server.

14. A method of completing transactions, comprising:
   detecting, by an input mechanism of a portable device, an identifier, the identifier including numbers and/or letters associated with a vehicle;
   identifying, by the portable device, a payment mechanism associated with the identifier, based on a user selection of the payment mechanism in a digital wallet, wherein the payment mechanism is related to a payment card;
   outputting, by the portable device, registration data for a toll operator to a remote server, the registration data including at least part of the identifier associated with the vehicle and the identified payment mechanism; and
   forwarding, by the remote server, at least part of the registration data to the toll operator, thereby registering the identifier with the toll operator and permitting the toll operator to initiate a transaction using the payment mechanism when the identifier associated with the vehicle is detected at a toll-gate associated with the toll operator.

15. A method according to claim 14, wherein detecting the identifier comprises capturing, by the input mechanism, an image of the identifier, and analysing the image to identify the identifier.

16. A method according to claim 14, further comprising sending, by the remote server, a confirmation request to a user prior to completing the transaction.

17. A method according to claim 16, comprising completing the transaction in dependence on receiving confirmation from the user.

\* \* \* \* \*